(12) United States Patent
Kruger et al.

(10) Patent No.: US 7,118,827 B2
(45) Date of Patent: Oct. 10, 2006

(54) BATTERY ASSEMBLY AND METHOD OF MAKING SAME

(75) Inventors: Duane D. Kruger, Fishers, IN (US); Robert C. Beer, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 491 days.

(21) Appl. No.: 10/635,133

(22) Filed: Aug. 6, 2003

(65) Prior Publication Data

US 2005/0031946 A1 Feb. 10, 2005

(51) Int. Cl.
*H01M 2/02* (2006.01)
*H01M 2/10* (2006.01)

(52) U.S. Cl. .................. 429/152; 429/159; 429/186

(58) Field of Classification Search .................. 429/99, 429/152, 153, 156, 158, 159, 160, 161, 186, 429/208
See application file for complete search history.

(56) References Cited

U.S. PATENT DOCUMENTS

| | | | | |
|---|---|---|---|---|
| 1,526,208 A | * | 2/1925 | Gill | 429/161 X |
| 1,547,447 A | * | 7/1925 | Rifkin | 429/186 X |
| 3,841,915 A | * | 10/1974 | Eberle | 429/160 |
| 3,944,436 A | * | 3/1976 | Gaide | 429/159 |
| 5,001,024 A | * | 3/1991 | Eberle | 429/160 |
| 6,190,797 B1 | * | 2/2001 | Miyagi et al. | 429/160 |
| 6,224,998 B1 | | 5/2001 | Brouns et al. | 429/100 |
| 6,340,538 B1 | | 1/2002 | King | 429/96 |
| 6,406,815 B1 | | 6/2002 | Sandberg et al. | 429/231.95 |

* cited by examiner

*Primary Examiner*—Stephen J. Kalafut
(74) *Attorney, Agent, or Firm*—Paul L. Marshall

(57) ABSTRACT

A battery assembly is designed to include a plurality of cells positioned parallel to each other. A frame including end supports position the cells appropriately. Each of the cells includes a first terminal and a second terminal. Two buses are positioned over all of the first terminals and all of the second terminals. Each of the buses includes slots allowing the terminals to extend therethrough. Once through, the terminals are bent over the bus bar. A slide is then positioned over the terminals protecting the terminals and maintaining the terminals in electrical contact with each other. This battery assembly allows more than three cells to be connected to each other and is versatile enough to allow the removal of certain cells to enhance the airflow through the battery assembly.

21 Claims, 8 Drawing Sheets

BATTERY ASSEMBLY AND METHOD OF MAKING SAME

BACKGROUND ART

1. Field of the Invention

The invention relates to a battery. More particularly, the invention relates to a battery being fabricated of component parts and a method for assembling same.

2. Description of the Related Art

Batteries are fabricated by combining a number of individual cells together. Batteries are a collection of cells connected in parallel and/or series. When the battery is to be used with a stationary device, merely connecting the terminals and allowing the cells to sit side by side in a simple structure is adequate.

Simple structures for batteries are inadequate, however, when the environment in which a battery is placed is hostile. Examples of hostile environments include elements of extreme temperature changes, humidity, and vibration, all of which are typically found in automobiles, aircraft, watercraft and the like. These batteries require a structure to support the cells in relation to each other. In addition, these batteries require permanent connections between the cell terminals to eliminate disconnections due to vibrations and jarring motions.

Currently, batteries fabricated using plate-like cells include gluing the sides of the cells together. The terminals are welded together using an ultrasonic welding process and then bent at 90 degrees. This method of fabrication limits the number of cells that can be connected in parallel to three cells. The bending of the terminals at 90 degrees increases the stress levels in some of the terminals more than others. Increasing the stress levels in the terminals makes the terminals more prone to failure due to vibration and corrosion. In addition, the ability to form a battery using more than three cells is greatly inhibited due to the limitation of the ultrasonic welding process.

SUMMARY OF THE INVENTION

A battery assembly stores electrical energy. The battery assembly includes a frame defining a plurality of channels. A plurality of cells having first and second terminals extending out therefrom are received and positioned by one of the plurality of channels such that the first terminals are aligned and the second terminals are aligned. A bus is positioned over the first and second terminals such that the bus bends each of the first terminals into electrical contact with each of the other terminals. In addition, the bus bends each of the second terminals into electrical contact with each other.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
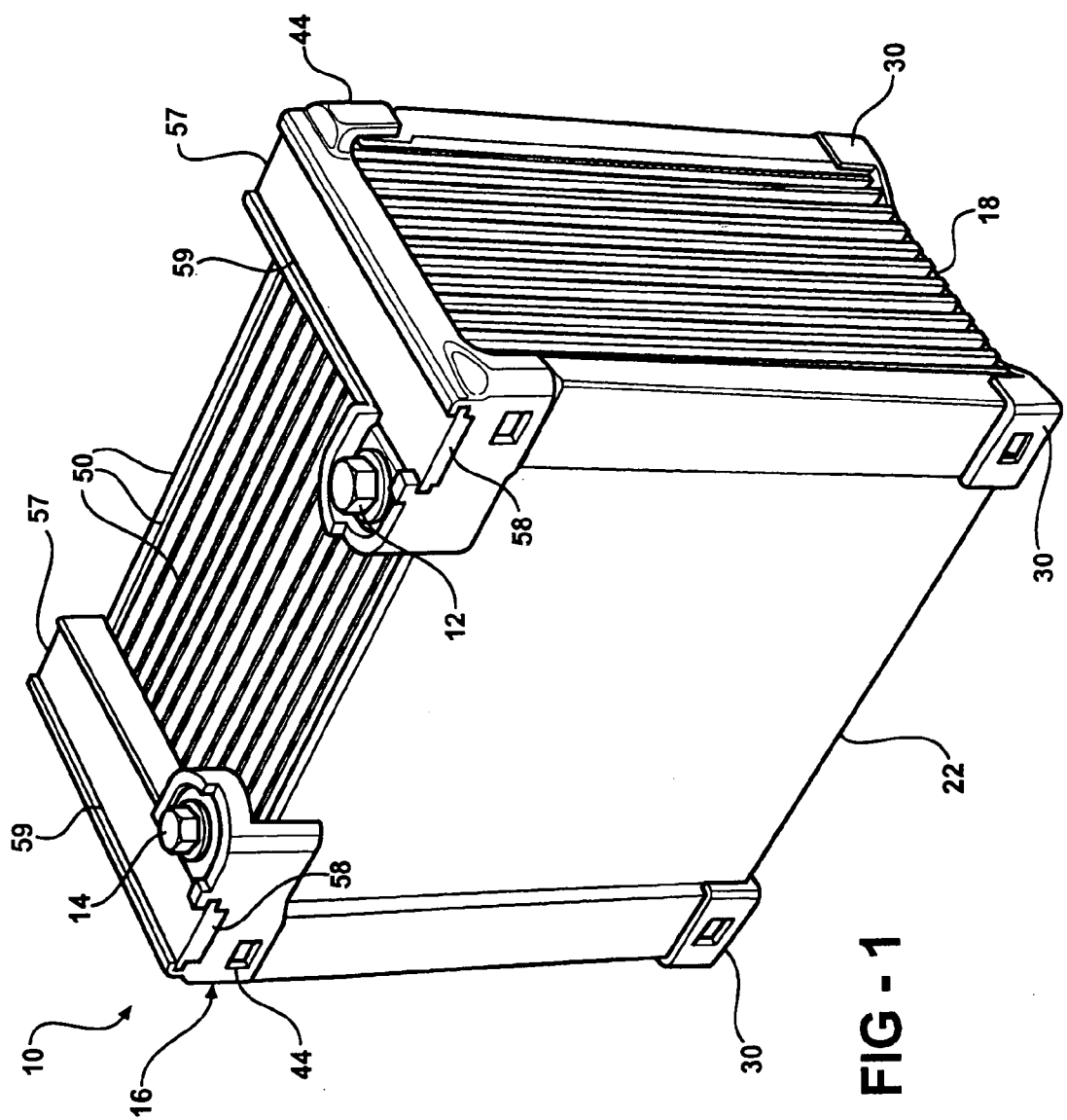
FIG. 1 is a perspective view of one embodiment of the invention.
Figure 2:
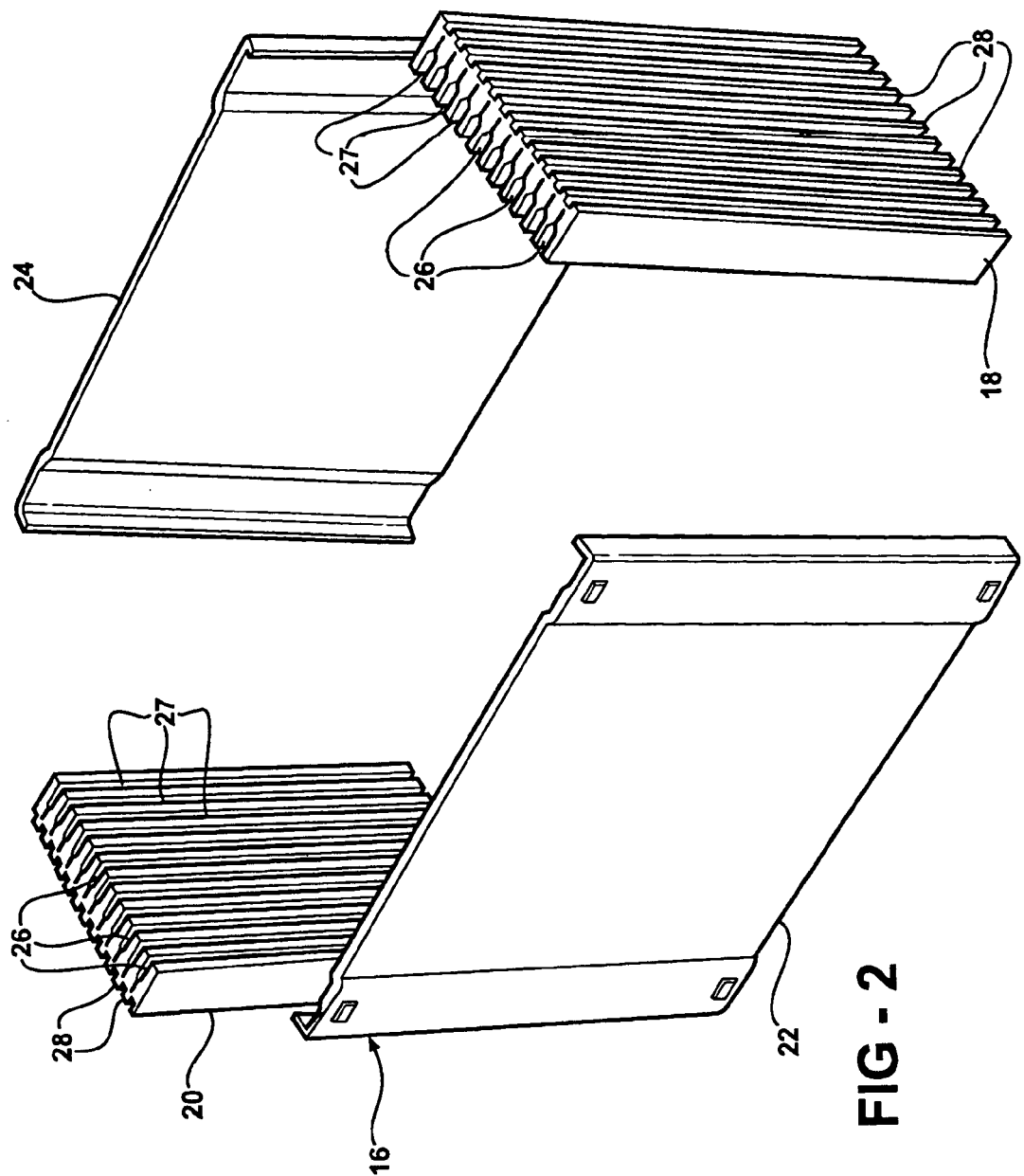
FIG. 2 is an exploded, perspective view of a frame for the battery assembly.
Figure 3:
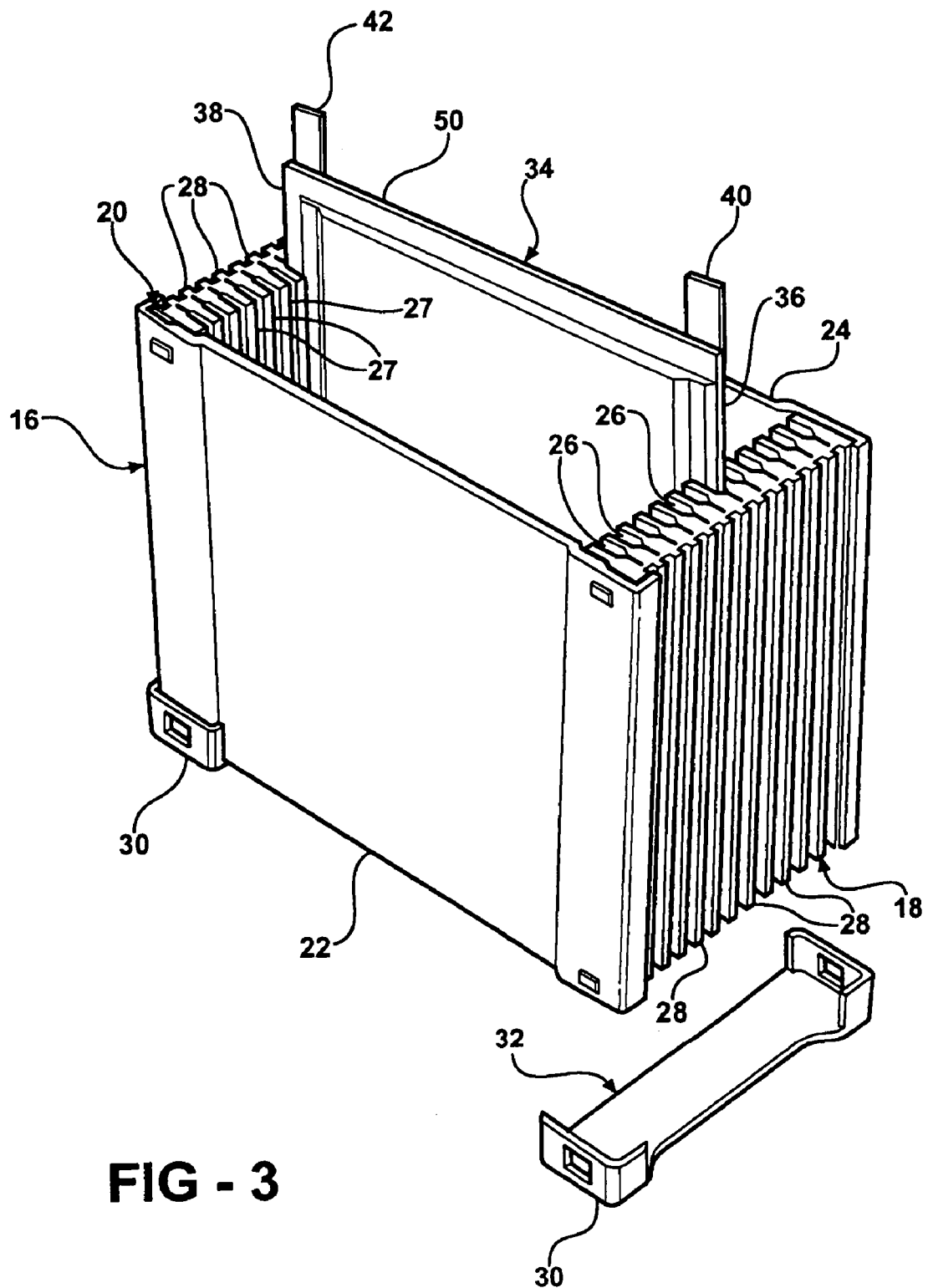
FIG. 3 is a partially exploded, perspective view of a battery assembly including a first cell being positioned within the frame of the battery assembly.

Referring to FIGS. 1 through 3, a battery assembly is generally indicated at 10. The battery assembly 10 stores electrical energy and releases this energy through an electrical current to a circuit that is connected to each of the two battery posts 12, 14 that act as terminals for the battery. The battery posts 12, 14 are shown as bolts that provide an electrical path to an electrical conductor, discussed subsequently, wherein the bolts are threadingly secured to the electrical contact so that an electrical circuit may be secured thereto by tightening the bolts of the battery posts 12, 14 forcing a physical, electrical connection therebetween. Please note, for sake of clarity and consistency, numbers shown in one figure may be repeated in additional figures illustrating the same feature.

The battery assembly 10 includes a frame, generally shown at 16. The frame 16 includes a pair of end supports 18, 20 and a pair of side supports 22, 24. In particular, a front side support 22 extends across a front of the battery assembly 10 between the two end supports 18, 20 at one end thereof and a back side support 24 extends across the battery assembly 10 between the end supports 18, 20 on a side opposite the front side support 22. The end supports 18, 20 and the side supports 22, 24 are snap fit together. More specifically, the front side support 22 and the back side support 24 position the end supports 18, 20 whereafter the front 22 and back 24 side supports are forced into the end supports 18, 20 to secure the end supports 18, 20 in position. The resulting structure resembles four sides of a box.

With the frame 16 snapped together, the frame 16 defines a plurality of channels 26. Each of the plurality of channels 26 is defined by a matching pair of grooves 27, each found in a respective end support 18, 20. Opposite each of the plurality of channels 26 are flexure ribs 28. The flexure ribs 28 allow the end supports 18, 20 to flex in a limited accordion-style movement due to the changes in cell size when operating in extreme conditions.

The frame 16 also includes a pair of bottom corner supports 30. The bottom corner supports 30 snap into place over the front 22 and back 24 side supports. In the embodiment shown in the Figures, the bottom corner supports 30 cover the ends of the end supports 18, 20. More specifically, the bottom corner supports 30 include extensions 32 that extend across the bottom sides of the end supports 18, 20. The extensions 32 will be discussed in greater detail subsequently.

The battery assembly 10 includes a plurality of cells 34. Each of the cells 34 is generally planar and extends between a first side 36 and a second side 38. As is typical with cell construction, each of the plurality of cells 34 is fabricated from a plurality of bi-cells that are connected together in a manner known in the art. Potential is transferred from one plate to another through the intermediate material to allow current to pass therethrough. Each of the cells 34 includes a first terminal 40 and a second terminal 42. The first terminal 40 is disposed adjacent and extending out and away from the first side 36 of the cell 34, whereas the second terminal 42 is disposed adjacent to and extending out from the second side 38 of the cell 34. The first 40 and second 42 terminals are oriented such that they may be considered extensions of the first 36 and second 38 sides. As is typical with cell construction, the first terminal 40 is physically connected the positively charged plates within the cell 34 and the second terminal 42 is physically connected to the negatively charged plates of the cell 34. This allows current to flow through the cell 34 between the first 40 and second 42 terminals, depending on which of the terminals 40, 42 is connected to which of the plates disposed therein.

Figure 7:
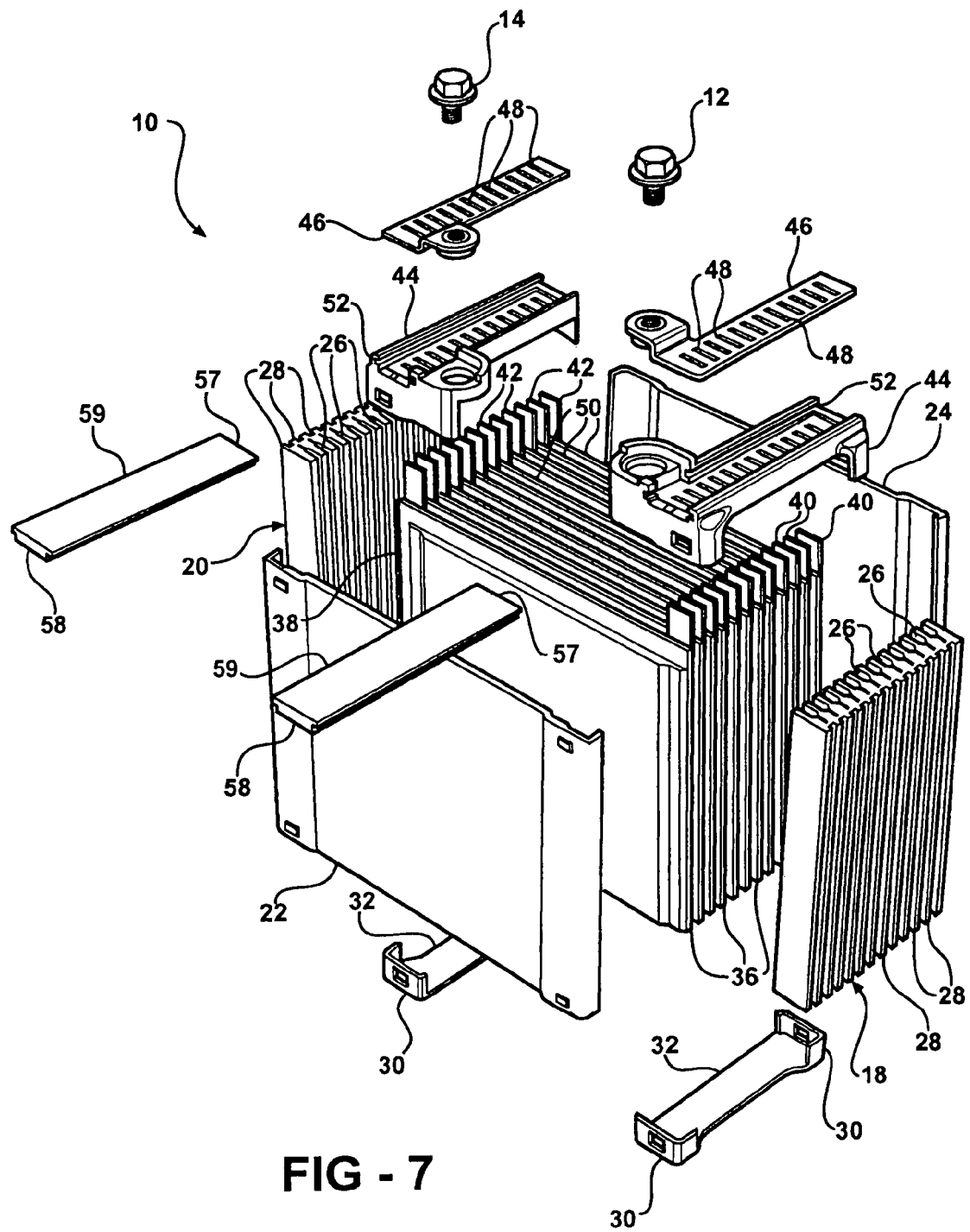
FIG. 7 is an exploded perspective view of a complete battery assembly.
Figure 8:
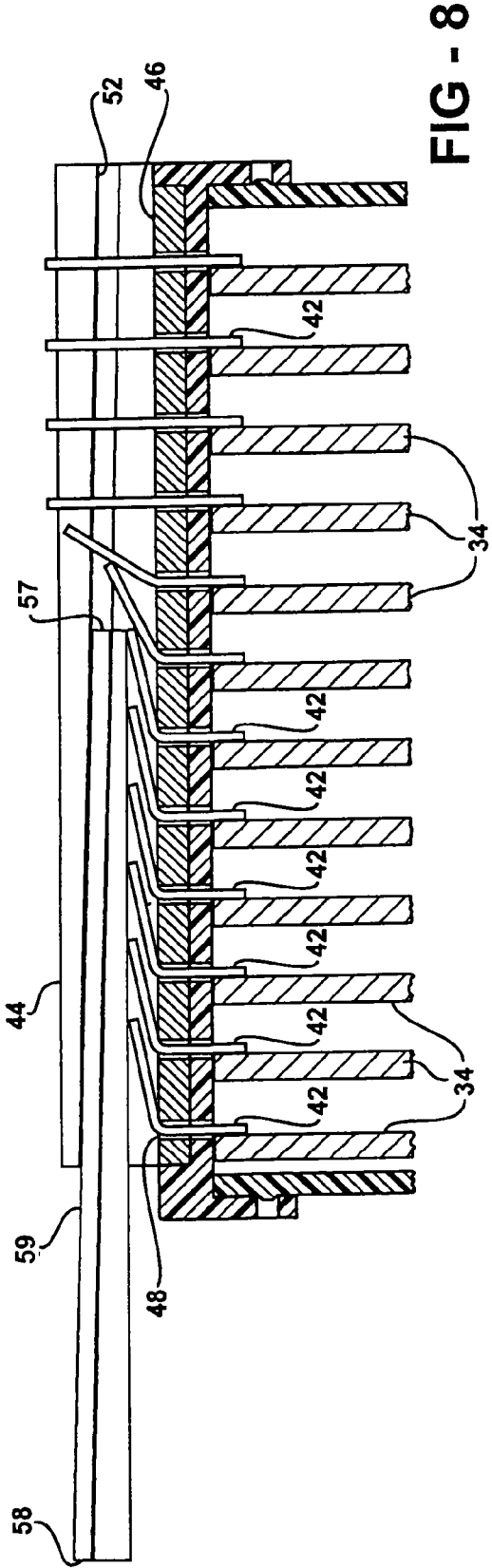
FIG. 8 is a side view, partially cut away, of a slide being moved into a final position.
Figure 9:
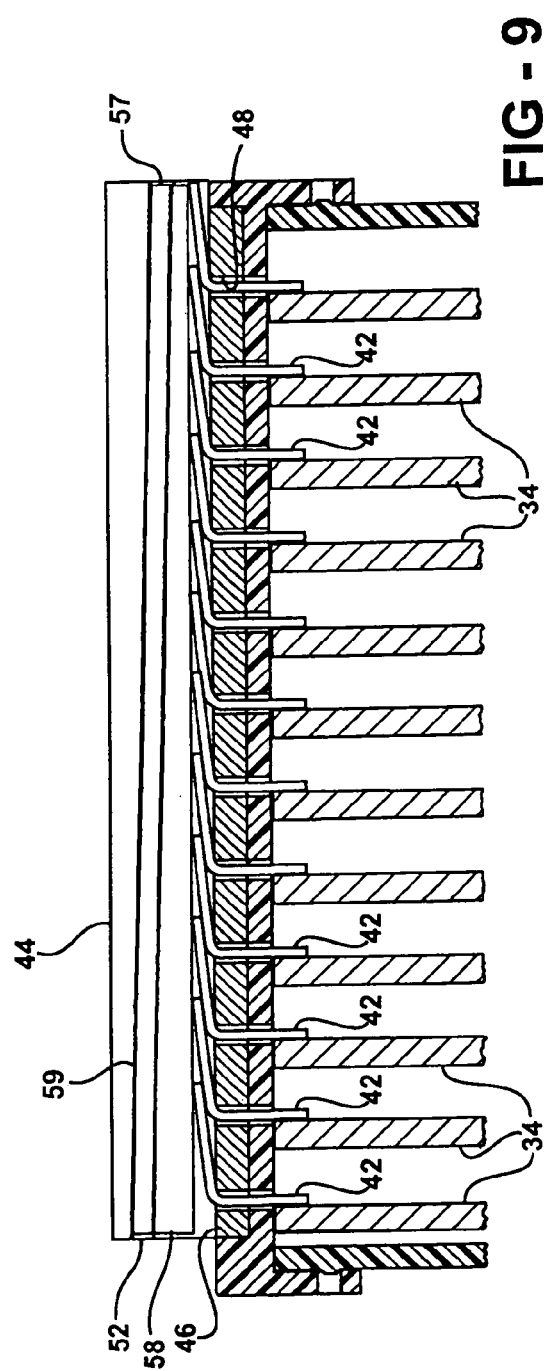
FIG. 9 is a side view, partially cut away of the slide in its final position with respect to the frame and bus support.

The battery assembly 10 is constructed such that each of the plurality of cells 34 are slid into one of the plurality of channels 26. Therefore, the battery assembly 10 is constructed such that a plurality of cells 34 are positioned in the plurality of channels 26 parallel to each other and secured within the battery assembly 10 side by side. This construction is represented in FIGS. 7 through 9.

Figure 4:
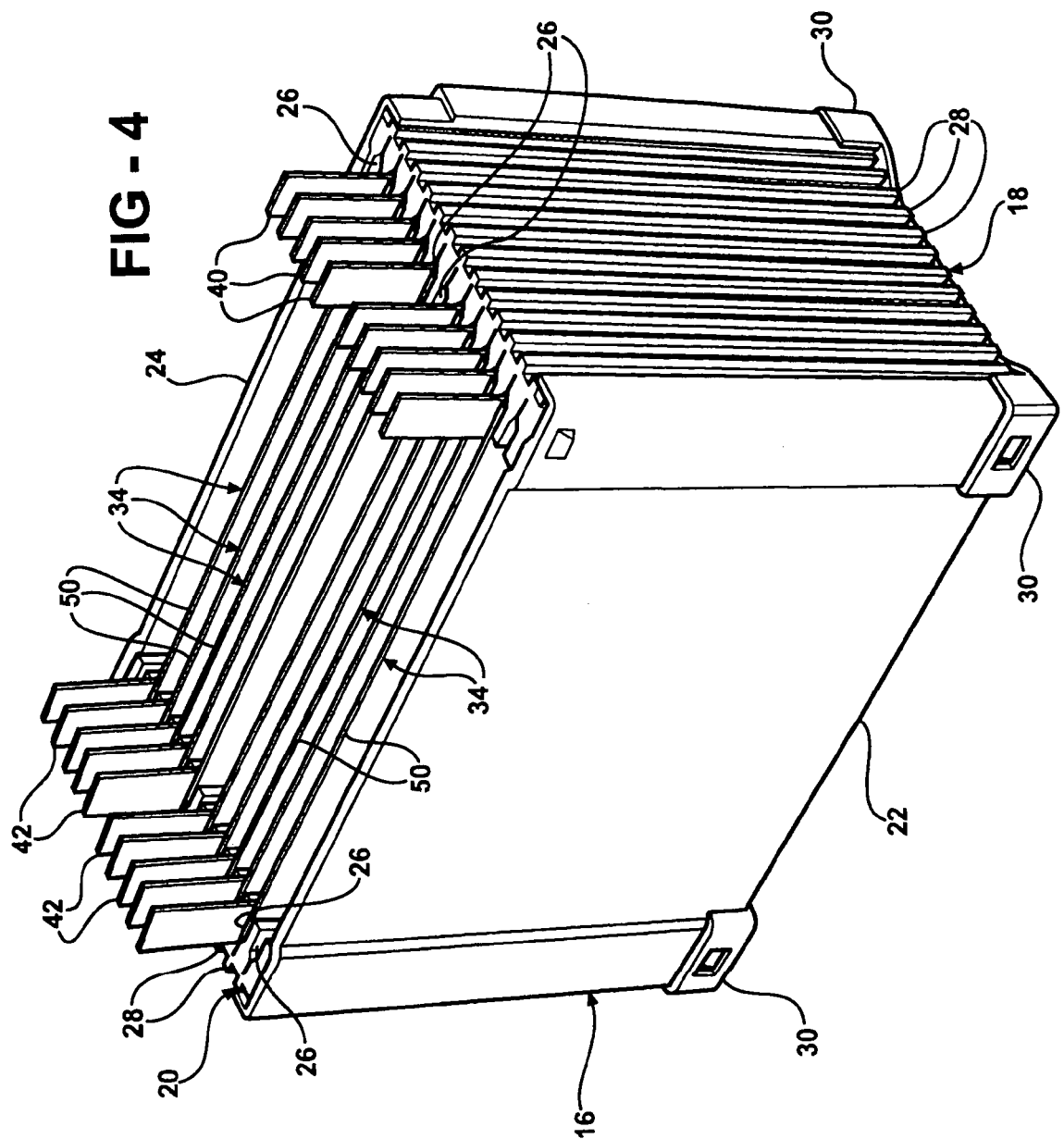
FIG. 4 is a perspective view of a battery assembly after a plurality of cells have been positioned inside the frame.
Figure 5:
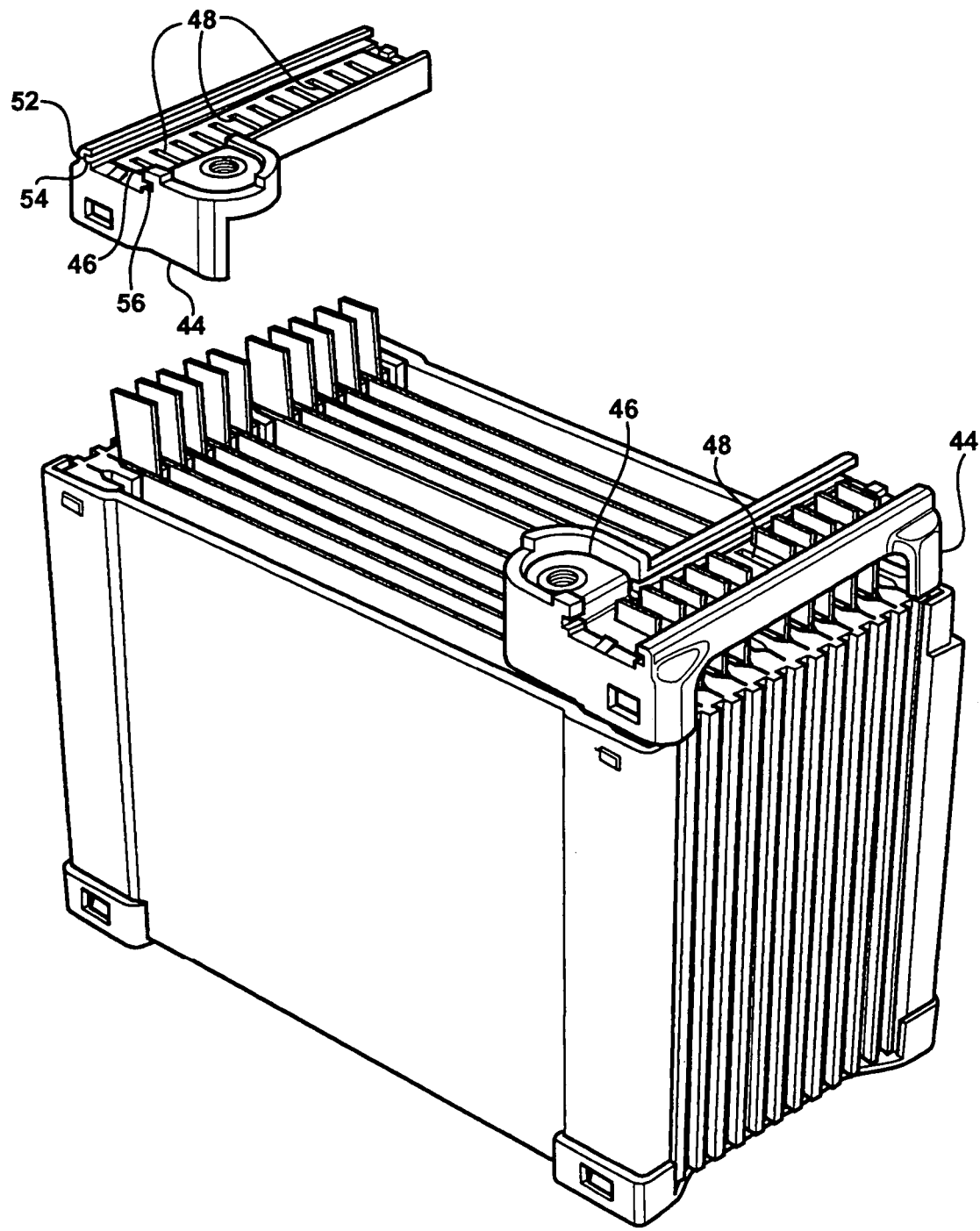
FIG. 5 is a partially exploded, perspective view of a battery assembly having the bus supports placed over the frame of the battery assembly.
Figure 6:
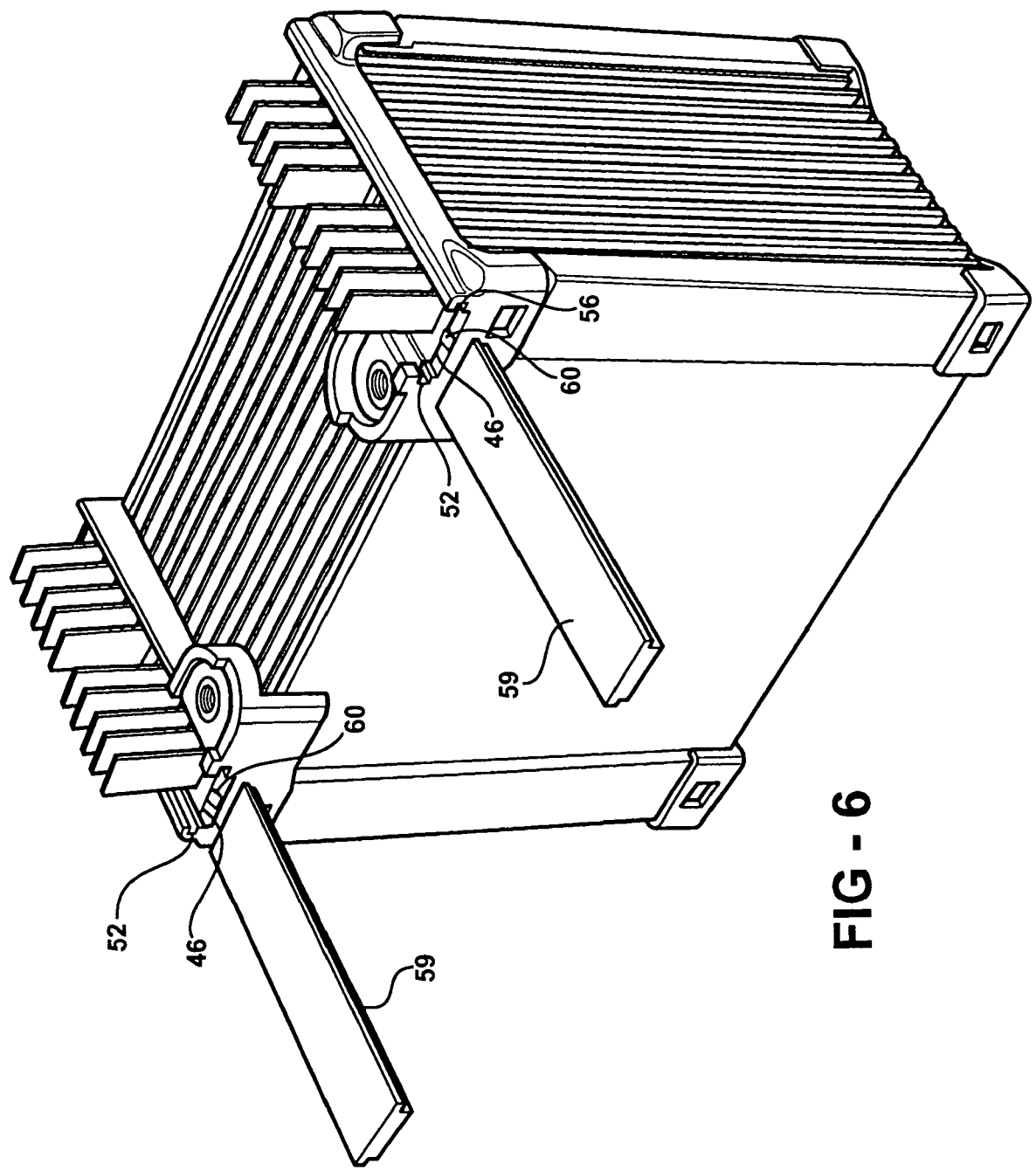
FIG. 6 is a partially exploded, perspective view of a battery assembly with slides being placed into the bus supports.

In FIGS. 4 through 6, the battery assembly 10 is constructed without having every channel 26 filled with a cell 34. In this embodiment, the output of the battery assembly 10 is allowed to be less than would be otherwise should all of the channels 26 be filled with a cell 34. The empty cells 26 are spaced throughout the battery assembly 10 allowing empty space to exist periodically through the battery assembly 10. This empty space enhances the ability of the battery assembly 10 to be cooled by allowing larger volumes of air to flow through the battery assembly 10 between specific cells 34 that are adjacent but not positioned in adjacent channels 26.

Regardless of the number of cells 34 used in the battery assembly 10, the cells 34 are positioned by the extensions 32 of the bottom corner supports 30. The cells 34 are slid into each of the channels 26 until they abut the extensions 32 of the bottom corner supports 30. This ensures each of the cells 34 is positioned uniformly with respect to each other and the frame 16.

The battery assembly 10 also includes top corner supports 44 that snap into place over the end supports 18, 20, the side supports 22, 24 and each of the cells 34. Each of the top corner supports 44 includes a bus bar 46, best seen in FIG. 7. The top corner supports 44 are bus supports that will be described in greater detail subsequently. The bus bar 46 is supported by the bus supports 44. The bus bar 46 is received within the bus supports 44. The bus bar 46 is fabricated from a conductive material and is designed to physically contact each of the first 40 and second 42 terminals. The battery assembly 10 includes two buses 46 such that one of the buses 46 contacts only the first terminals 40 and the other of the buses 46 contacts only the second terminals 42. While one embodiment of the battery assembly 10 could have just one bus support 44 of unitary structure extending across the battery assembly 10 should the bus supports 44 are fabricated of a nonconductive material, the preferred embodiment shown in the Figures shows that the battery assembly 10 incorporates the use of two bus supports 44, one for each of the two buses 46.

Each of the buses 46 includes a plurality of slots 48. The plurality of slots 48 correspond to each of the terminals 40, 42 of each of the cells 34. This allows each of the buses 46 to extend down over the terminals 40, 42 to be positioned adjacent a top surface 50 of each of the cells 34. Once each of the buses 46 are positioned over the top surface 50 of the cells 34 with the terminals 40, 42 extending through each of the slots 48, the terminals 40, 42 are bent over each other so that each of the terminals 40, 42 contact each other and the bus bar 46. More specifically, with reference to FIGS. 8 and 9, the first terminals 40 are bent over each other allowing them to contact each other and the second terminals 42 are bent over each other allowing contact therebetween. Therefore, the first terminals 40 create a single terminal for the battery assembly 10 and the second terminals 42 create a single terminal for the battery assembly 10. Thus, by connecting an electrical circuit to the battery posts 12, 14 effectively connects the electrical circuit to first 40 and second 42 terminals, respectively.

The bus supports 44 include a guide 52 which extends across the entire length of the buses 46. The guides 52 are defined by two guide channels 54, 56 on either side of the buses 46.

A slide 59 is received by the bus supports 44. The slides 59 extend through the guides 52 and cover the first 40 and second 42 terminals. Stops 60 prevent the slides 59 from being removed from the guides 52. To tighten the contact between the first terminals 40 and second terminals 42, respectively, the guide 52 extends along the bus supports 44 at an angle with respect to the frame 16 and the top surface 50 of the cells 34. The angle, best seen in FIGS. 8 and 9, is an acute angle such that a first end 57 of each of the slides 59 is positioned closer to the top surface 50 of the cells 34 than a second end 58 of the slides 59. In addition, the second end 58 of the slide 59 is greater in depth than the first end 57 of the slide 59. In the embodiment shown in the FIGS., the slide 59 is used to force the terminals 40, 42 to bend over each other resulting in the electrical connection between all of the cells 34. In an alternative embodiment (not shown), the terminals 40, 42 are bent over each other prior to the insertion of the slide 59 into the guide 52. In this alternative embodiment, a mask may be placed over the terminals 40, 42. In addition, a kinetic spray may be applied to the terminals before the slides 59 are placed in position over the terminals 40, 42. The addition of the mask and the kinetic spray enhance the connection between the terminals 40, 42 and, at the same time, inhibits corrosion due to the harsh environment in which the battery assembly 10 may be placed.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed:

1. A battery assembly for storing electric energy comprising:
    a frame defining a plurality of channel pairs, one channel of each pair at each lateral end of a cell;
    a plurality of cells having first and second terminals extending out therefrom, each of said plurality of cells being received and positioned by one of said plurality of channel pairs such that said first terminals are aligned and said second terminals are aligned; and
    a bus bar positioned over said first and second terminals such that said bus provides electrical contact for each of said first terminals to electrical contact each other and said bus bar provides electrical contact for each of said second terminals to electrical contact each other to allow said battery assembly to provide the electric potential from said plurality of cells.

2. A battery assembly as set forth in claim 1 wherein said frame defines a bus support for receiving said bus bar therein.

3. A battery assembly as set forth in claim 2 including a slide receivable by said bus support to maintain said first and second terminals in electrical contact with said bus bar.

4. A battery assembly as set forth in claim 3 wherein said bus support includes a guide for receiving said slide therein.

5. A battery assembly as set forth in claim 4 wherein said bus bar includes a plurality of slots allowing each of said first and second terminals to pass therethrough when said bus is mounted to said frame.

6. A battery assembly as set forth in claim 5 wherein said guide extends along said bus support at an angle.

7. A battery assembly as set forth in claim 6 wherein said angle is acute.

8. A battery assembly as set forth in claim 7 wherein said bus includes a terminal receiving surface for receiving said first and second terminals thereagainst.

9. A battery assembly as set forth in claim 8 wherein said bus includes an electrical conductor to contact each of said first and second terminals.

10. A battery assembly as set forth in claim 9 wherein said housing includes a front side support extending across one of said plurality of cells to protect said plurality of cells.

11. A battery assembly as set forth in claim 10 wherein said housing includes a back side support extending across another of said plurality of cells to protect said plurality of cells.

12. A battery assembly as set forth in claim 11 including end supports defining said plurality of channel pairs, said end supports extending between said front and back side supports on either of said plurality of cells.

13. A battery assembly as set forth in claim 12 including protrusions extending out of each of said front and back side supports.

14. A battery assembly as set forth in claim 13 wherein said bus supports include apertures for receiving said protrusions therethrough to snap lock said frame together.

15. A battery assembly for storing electric energy comprising:
a frame defining a plurality of channel pairs, one channel of each pair at each lateral end of a cell, and a bus support;
a plurality of cells less than said plurality of channel pairs having first and second terminals extending out therefrom, each of said plurality of cells being received and positioned by one of said plurality of channel pairs such that said first terminal are aligned and said second terminals are aligned;
a bus bar defining a plurality of slots greater than said plurality of cells allowing each of said first and second terminals to pass therethrough when said bus is mounted to said frame, said bus bar positioned over said first and second terminals such that said bus provides electrical contact for each of said first terminals to electrical contact each other and said bus bar provides electrical contact for each of said second terminals to electrical contact each other to allow said battery assembly to provide the electric potential from said plurality of cells; and
a slide receivable by said bus support to maintain said first and second terminals in electrical contact with said bus bar.

16. A battery assembly as set forth in claim 15 wherein said bus support includes a guide for receiving said slide therein.

17. A battery assembly as set forth in claim 16 wherein said guide extends along said bus support at an angle.

18. A battery assembly as set forth in claim 17 wherein said angle is acute.

19. A battery assembly as set forth in claim 18 wherein said bus includes a terminal receiving surface for receiving said first and second terminals thereagainst.

20. A battery assembly as set forth in claim 19 wherein said bus includes an electrical conductor to contact each of said first and second terminals.

21. A battery assembly as set forth in claim 20 wherein said housing includes a front side support extending across one of said plurality of cells to protect said plurality of cells.

* * * * *